US006727985B2

(12) United States Patent
Giger

(10) Patent No.: US 6,727,985 B2
(45) Date of Patent: Apr. 27, 2004

(54) SYSTEM AND METHOD FOR SIGNAL ACQUISITION IN A DISTANCE METER

(75) Inventor: Kurt Giger, Rüthi (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 10/391,011

(22) Filed: Mar. 19, 2003

(65) Prior Publication Data
US 2003/0164546 A1 Sep. 4, 2003

Related U.S. Application Data

(63) Continuation of application No. PCT/CH01/00492, filed on Oct. 8, 2001.

(30) Foreign Application Priority Data

Sep. 27, 2000 (CH) .................................. 1893/00

(51) Int. Cl.[7] .......................... G01C 3/08; G01S 13/00; H03D 1/00
(52) U.S. Cl. ..................... 356/5.15; 356/5.09; 342/175; 329/345; 329/347
(58) Field of Search ............... 356/5.09–5.15; 342/175; 329/345, 347

(56) References Cited

U.S. PATENT DOCUMENTS 4,065,722 A * 12/1977 Francis ...................... 329/105
5,179,286 A    1/1993 Akasu
5,737,085 A *  4/1998 Zollars et al. .............. 356/376
2002/0167439 A1 * 11/2002 Bloch et al.

FOREIGN PATENT DOCUMENTS

| AU | 719134       | 5/1998  |
| DE | 19643287 A1  | 4/1998  |
| EP | 0 679 896 A1 | 11/1995 |
| JP | 57151807     | 9/1982  |
| JP | 57-151807  * | 9/1982  |

* cited by examiner

Primary Examiner—Stephen C. Buczinski
(74) Attorney, Agent, or Firm—Burns, Doane, Swecker & Mathis, L.L.P.

(57) ABSTRACT

A system for signal acquisition in a distance meter includes at least one photoelectric receiver that detects electromagnetic radiation that is high-frequency modulated via a modulation frequency and converts the same to high-frequency electrical signals (HF). A device is provided for transforming the high-frequency electrical signals (HF) supplied by the photoelectric receiver into low-frequency measuring signals (NF) that can be passed on to a signal-processing unit mounted downstream of the device. The device for transforming the high-frequency electrical signals (HF) supplied by the photoelectric receiver into low-frequency measuring signals (NF) can include at least one switch whose switching frequency is controlled by a control frequency (F) whose frequency is higher or lower than the modulation frequency by the amount of the low-frequency measuring signal. The high-frequency actuated switch is linked with a capacitor mounted down-stream thereof to which a transimpedance amplifier is connected, at whose output the low-frequency measuring signal (NF) is available when the device is operational.

13 Claims, 4 Drawing Sheets

SYSTEM AND METHOD FOR SIGNAL ACQUISITION IN A DISTANCE METER

RELATED APPLICATIONS

This application is a continuation of PCT/CH01/00492 filed on Oct. 8, 2001.

BACKGROUND

The invention relates to a distance meter, in particular to a system and a method for signal acquisition in a distance meter.

Distance meters of this generic type are well known in the prior art. They have a distance measuring range of several tens of meters and are often embodied as a handheld units. They are used primarily in construction surveying or in indoor construction, for instance for measuring rooms three-dimensionally. Other areas of application for distance meters are geodetic and industrial surveying. The fundamental principle of distance measurement by the known instruments is based on evaluating a change over time of a parameter of the electromagnetic beam emitted by the instrument and remitted by an object aimed at. To that end, the distance meter is equipped with an emitter for emitting an intensity-modulated beam. In handheld instruments, this primarily involves an optical beam in the visible wavelength spectrum, to make it easier to aim at the measurement points. The optical beam is remitted or scattered by the measurement object aimed at and is recorded by a receiver built into the instrument. From the time lag of the received modulated beam compared to the beam emitted by the emitter, the distance from the measurement object is found.

As detectors, PIN photodiodes or avalanche photodiodes are typically used in the known distance meters for converting the beam remitted or scattered by the measurement object into electrical signals. Distance meters whose distance determination is based on the measurement principle of phase measurement are very widely used. In such instruments, the electrical reception signal has a control frequency superimposed on it, directly at the avalanche photodiode or after a preamplifier, to make a low-frequency measuring signal. The phase of this low-frequency signal is determined and compared with the phase of a reference signal. The difference between the measured phase of the low-frequency measuring signal and the phase of the reference signal is a measure of the distance of the measurement object.

From German Patent Disclosure DE-A 196 43 287, a method and a system for calibrating distance meters are known. In particular, this reference describes how, when an avalanche photodiode is used, a stable reference phase can be generated to enable guaranteeing the measurement accuracy even in the presence of various environmental factors and equipment-dictated factors. Compared to other known photodiodes, such as PIN photodiodes, avalanche photodiodes have approximately 100 times the gain and thus have a correspondingly greater sensitivity. To achieve this high gain, they require markedly higher operating voltages in operation, and this is highly dependent on the working temperature of the avalanche photodiode. The operating voltage is applied as a bias voltage to the avalanche photodiode and is moreover individually different from one photodiode to another. Avalanche photodiodes are produced in a multi-stage, highly specialized semiconductor process. Additionally integrating circuit components by which the requisite bias voltage is stabilized and reduced to an expedient level would make the production process even more complicated and would increase the already high costs for avalanche photodiodes still further. The requisite high bias voltage and the increased power consumption prove especially disadvantageous for portable handheld instruments, which are operated with batteries or accumulators. The greater number of conventional batteries requires larger housings that are not as handy. Moreover, the readiness for use of these battery-operated instruments is relatively brief. Using special batteries or accumulators also affects the size and handiness of the handheld instruments and moreover increases the price.

SUMMARY

An object of the invention is to create a distance meter which can have lower power consumption. The housing of the instrument can be kept small, so that particularly in handheld instruments, handiness is assured. The costs for producing the instrument can also be kept low.

An exemplary system for signal acquisition in a distance meter includes at least one photoelectric receiver, which detects an electromagnetic beam modulated at high frequency via a modulation frequency, and converts it into high-frequency electrical signals, and a device for transforming the high-frequency electrical signals, furnished by the photoelectric receiver, into low-frequency measuring signals, which can be carried onward for evaluation to a signal-processing unit mounted downstream. The device for transforming the high-frequency electrical signals, furnished by the photoelectric receiver, into low-frequency measuring signals includes, according to an exemplary embodiment, at least one switch, whose switching frequency is controlled by a control frequency whose frequency is greater or less, by the frequency of the low-frequency measuring signal, than the modulation frequency. The switch, which can be actuated at high frequency, is connected to a downstream capacitor, which is adjoined by a transimpedance amplifier at whose output, in operation, the low-frequency measuring signal is present.

In an exemplary circuit arrangement, the output of the photoelectric receiver is applied directly to a switch. The high-frequency electrical signal is carried to a capacitor by the switch that is also switched at high frequency. The switching frequency of the switch is slightly greater or less than the modulation frequency of the emitted electromagnetic beam. A transimpedance amplifier is coupled to the capacitor, and the charge collected at the capacitor is carried away to it. In this way, the voltage at the capacitor remains practically nearly constant. A low-frequency measuring signal is applied to the output of the transimpedance amplifier and is evaluated in the usual way in the downstream signal-processing unit. The switch that can be operated at high frequency replaces the relatively complex mixer, known from the instruments in the prior art, in which the high-frequency electrical signals furnished by the photoelectric receiver have a control frequency superimposed on them in order to generate low-frequency measuring signals from the high-frequency signals. The switch is operated by way of the applied control frequency in such a way that the same half-wave of the high-frequency electrical signal is always switched through to the capacitor. From the capacitor, the charge switched through is carried onward, already at low frequency, to the transimpedance amplifier. In contrast to the known embodiments, a high-frequency electrical signal therefore need not be (pre-)amplified. This has the great advantage that, in contrast to the known versions, the transimpedance amplifier does not have to have a bandwidth in the range of several hundred megahertz, with a resultant transimpedance of only a few kiloohms. On the contrary, in an exemplary embodiment, transimpedance amplifiers for low-frequency signals with a bandwidth of only a few kilohertz suffice. With them, transimpedance that are greater by a factor of up to $10^3$ can be achieved. Given the fact that for medium ambient brightness, it is precisely the preamplifier of the measuring signal that is dominant in terms of noise in distance meters, the attainable improvement in the signal-to-noise ratio can be immediately appreciated. In the transimpedance amplifiers used, the thermal noise of the feedback resistance is definitive. The signal level at the output of the transimpedance amplifier rises linearly with the feedback resistance; the noise at the output, however, increases only in proportion to the square root of the feedback resistance. The transimpedance amplifiers with a relatively narrow bandwidth that can be used by circuit arrangements of the invention have precisely especially high feedback resistances and accordingly lead to a marked improvement in the signal-to-noise ratio. In this way, even with simple PIN photodiodes, signal-to-noise ratios can be attained that are equivalent to those when avalanche photodiodes are used. On the other hand, the known disadvantages of avalanche photodiodes are avoided.

To improve the signal levels, it proves advantageous to provide the sequential arrangement, of the switch controlled via the high-frequency control frequency, the downstream capacitor, and the transimpedance amplifier, in dual form. The two switches are switchable in alternation with the control frequency. As a result, both half-waves of the high-frequency electrical signal are added together at the output of the photoelectric receiver and are each delivered to one transimpedance amplifier. The outputs of the two transimpedance amplifiers are connected to the inputs of a differential amplifier that unites the two inverse, low-frequency measuring signals. With this provision, the signal-to-noise ratio can be improved still further.

An exemplary circuit arrangement furnishes the preconditions for integrating the signal acquisition system in a semiconductor component. Different scales of integration are possible. In each case, it is expedient to embody the high-impedance switches as field effect transistors. An integrated semiconductor component made with CMOS technology can be used. The transfer gates that can be achieved with this technology have the requisite high switching speeds and are distinguished by low power consumption and low supply voltages. In an advanced stage of integration, the capacitors and the downstream transimpedance amplifiers are disposed on the integrated semiconductor component. With the resultant shortening of the signal paths, particularly of the high-frequency signals, the broadcasting is also reduced. It is even possible for the circuit arrangement for generating the control frequency to be integrated with the semiconductor component, in order to avoid stray factors by means of the separate course of high-frequency signal paths in the instrument. The low power consumption of the integrated circuit arrangement proves advantageous for battery or accumulator operation of the distance meters. Moreover, there is less waste heat in operation, which allows a higher packing density of the components and has a favorable effect on the size of the handheld instruments.

The distance meters of this generic type are based on the principle of phase measurement. It proves advantageous if the receiver circuit required for a reference signal path has a structure analogous to the measuring signal path and is likewise disposed on the integrated semiconductor component. As a result of the integrated arrangement on the same semiconductor component, the calibration problems are elegantly solved. The receiver circuits for the measuring signals and for the reference signals are optimally coupled thermally and have a symmetry that with a conventional design can hardly be achieved.

In a further stage of integration, the photoelectric receiver for the measuring beam and optionally a separate photoelectric receiver for a reference beam can also be integrated on the semiconductor component. An exemplary circuit arrangement of the invention and the use of CMOS technology make it possible to perform this integration step as well, without major difficulties. Because of the further integration of the receiver arrangement, an even greater packing density is attainable, and the size of the handheld instrument can be reduced.

The integrated embodiment of the photoelectric receiver offers the possibility in a very simple way of embodying its active face in a segmented way. For instance, the photoelectric receiver can be equipped with at least two, and preferably three or more, receiver segments that are activatable independently of one another. This structural provision takes appropriate account of the fact that the measuring light spot that strikes the active face of the photoelectric receiver increases in size at a transition from long distances to shorter distances and also shifts in its position. This is a consequence of the projection properties of the input optical element of the distance meter. By the segmentation of the active face of the photoelectric receiver, this effect can be compensated for, and complicated additional optical elements that are vulnerable to flaws can be dispensed with.

In known distance meters, effort and expense is undergone so that the optical components and the photoelectric receiver are adjusted exactly. An integrated embodiment of the photoelectric receiver offers the possibility of providing adjustment aids.

To that end, at least one auxiliary photodiode embodied in integrated form is disposed in the vicinity of two edges, extending perpendicular to one another and adjacent one another, of the active face of the photoelectric receiver for the measuring beam. The auxiliary photodiodes, equipped with a simple downstream electronic detector, offer a simple capability of adjustment.

An integrated embodiment of a photoelectric receiver for the measuring beam and optionally a further photoelectric receiver for the reference beam on the semiconductor component also can offer a simple capability of providing optical filters in an integrated design. The integrated design in turn can have the great advantage that the optical filters for the photoelectric receivers for the measuring beam and for the reference beam have identical properties, because of the homogeneity of the production method.

The modulation frequency of the electromagnetic beam emitted by the distance meter is also determining for the control frequency with which the switch is operated. For the sake of attaining an especially good signal-to-noise ratio, control frequencies greater than 100 MHz prove advantageous.

A distance meter on the principle of phase measurement that is equipped with the system for signal acquisition of the invention can be distinguished by a simplified layout. It can have lower power consumption and can be operated with a lower supply voltage. This is advantageous especially for handheld devices, which because of the design according to the invention can also have a smaller housing.

BRIEF DESCRIPTION OF THE DRAWINGS

The invention is described in further detail below in conjunction with exemplary embodiments shown schematically in the drawings. Shown are.

DETAILED DESCRIPTION OF THE PREFERRED EMBODIMENTS

Figure 1:
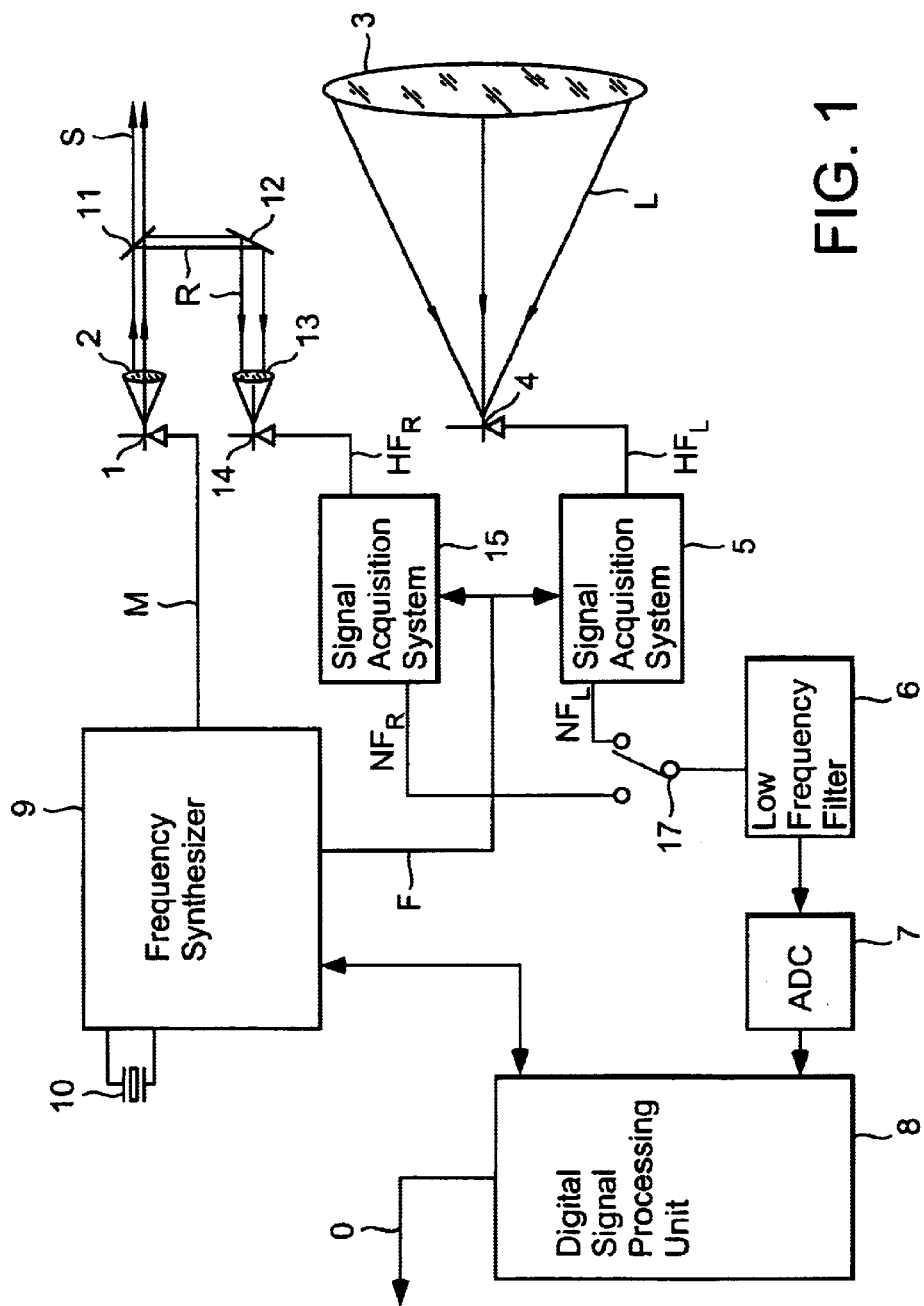
FIGS. 1–3, block diagrams of various exemplary embodiments of distance meters equipped with an exemplary system of the invention.
Figure 2:
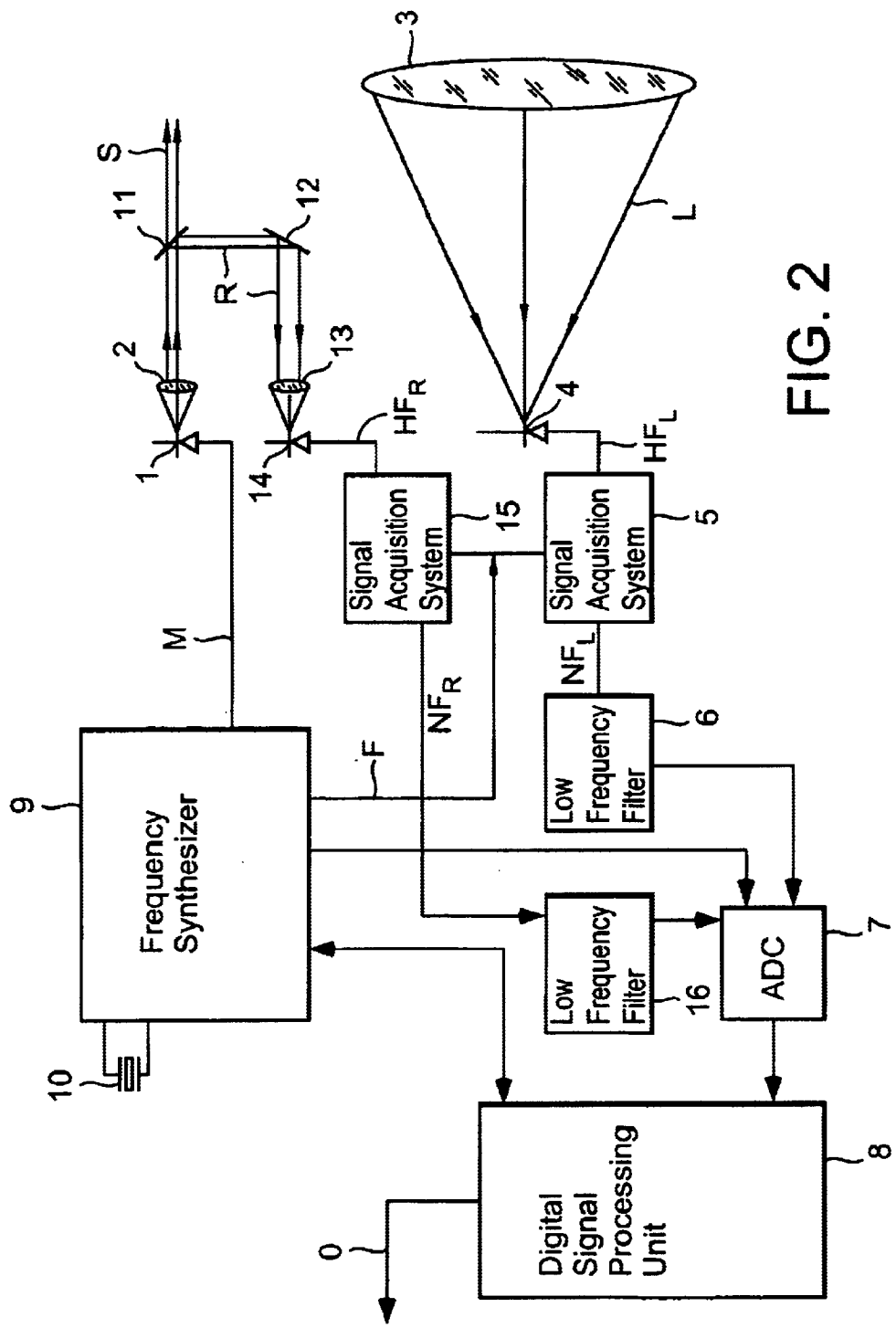
Figure 3:
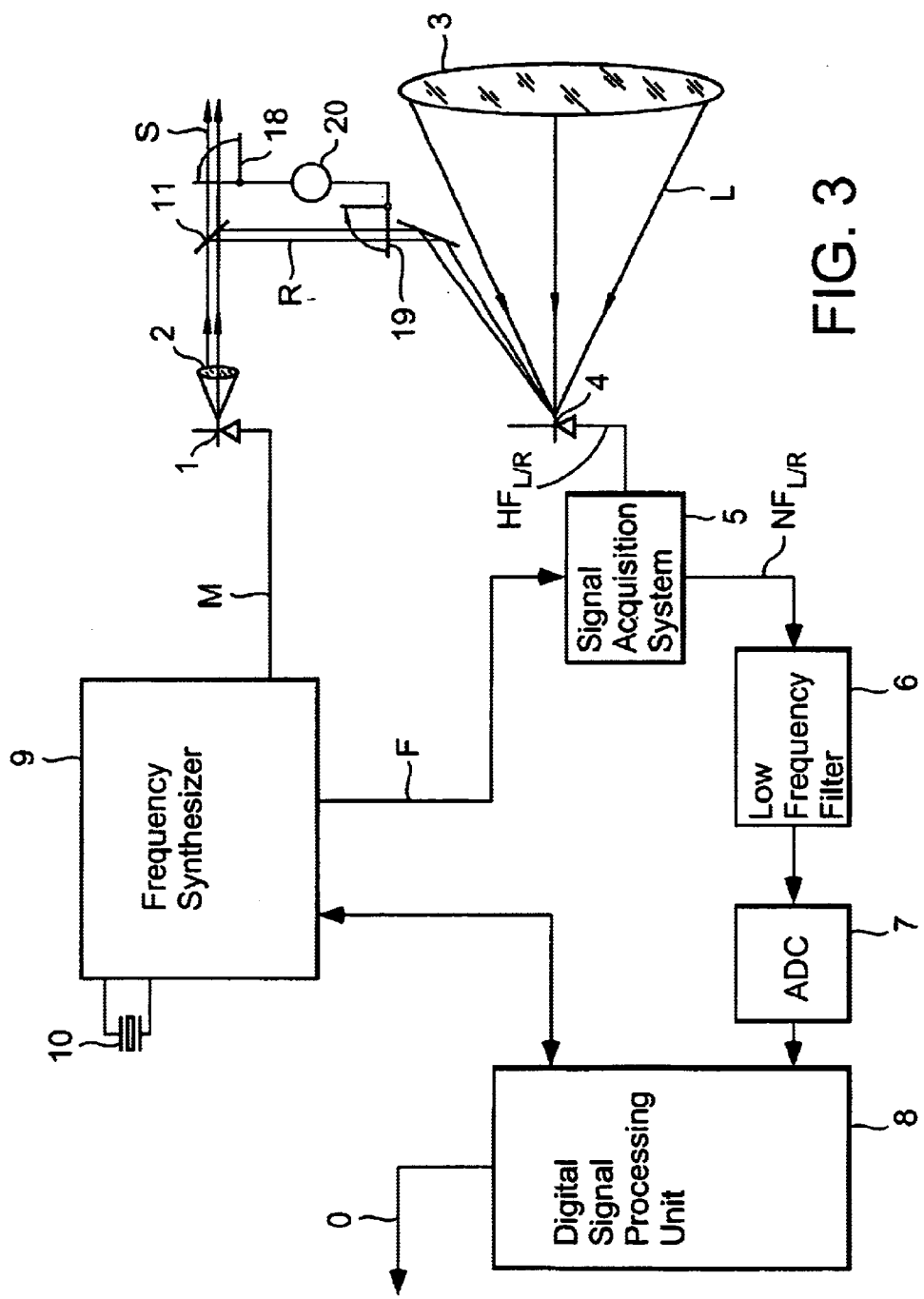

In FIGS. 1–3, exemplary variants of distance meters are shown that are equipped with an exemplary system for signal acquisition according to the invention. In these illustrations, identical components and elements are each provided with the same reference numerals. The distance meter in FIG. 1 has a laser source 1, which can emit, for example, visible laser radiation. The emitted laser radiation, collimated by a collimating optical element 2 is split by a beam splitter 11 into a measuring beam S and reference beam R. A partly transparent mirror can be used as the beam splitter 11, for instance. The measuring beam S reaches a measurement object, whose distance from the distance meter is to be measured. The beam L remitted or scattered by the measurement object is collected by a receiving optical element 3 and carried to a measuring receiver 4. A PIN photodiode is, for example, used as the measuring receiver 4. The reference beam R is deflected by a deflecting mirror 12 and collected by an optical element 13 and carried to a reference receiver 14. The reference receiver 14 is advantageously structurally identical to the receiver 14 for the measuring beam L. The distance traveled by the reference beam R from the beam splitter 11 to the reference receiver 14 forms the reference distance required to determine the phase difference.

The optical beam emitted by the laser source 1 has a high-frequency modulation frequency M impressed on it that is generated by a frequency synthesizer 9 which is triggered by a reference quartz crystal 10. Because of the high-frequency modulation frequency M, high-frequency electrical measuring signals $HF_L$, $HF_R$ are generated at the receiver 4 and reference receiver 14, respectively, and are applied to the input of systems, embodied according to an exemplary embodiment of the invention, for signal acquisition, as identified in FIG. 1 by reference numerals 5 and 15, respectively. The frequency synthesizer 9 also generates a control frequency F of a similarly high frequency, which is supplied via a connecting line to the two systems 5, 15 for signal acquisition and which furnishes the clock speed for both systems 5, 15. In the signal acquisition systems 5, 15, which will be described in further detail hereinafter, the high-frequency input signals $HF_L$, $HF_R$ are transformed into low-frequency measuring signals $NF_L$ or calibration signals $NF_R$.

The low-frequency measuring signals $NF_L$ and calibration signals $NF_R$ present at the output of the two signal acquisition systems 5, 15 are delivered sequentially, via an analog switch 17, to a low-frequency filter 6, in which the remaining high-frequency signal components are filtered out. By way of example, the filter is an anti-aliasing filter. The filtered and amplified measuring signals and calibration signals $NF_L$ and $NF_R$, respectively, are digitized in an analog/digital converter 7 and are evaluated as to their phase relationship in a digital signal-processing unit 8. From the phase relationship, a conclusion is drawn about the distance from the measurement object, which is carried onward in the form of a signal O to an output unit. The control frequency F is advantageously selected such that the equation $F=(n \times M) \pm NF$ applies. Thus the control frequency F is an integral multiple of the modulation frequency M, plus or minus the value of the low-frequency signal NF. The value of n is greater than 0.

The exemplary embodiment of a distance meter shown in FIG. 2 is largely equivalent to that described in conjunction with FIG. 1. The essential distinction is that the circuit layout and the arrangement of components make it possible for the reference beam R and the beam L scattered or remitted by the object to be detected and evaluated simultaneously. In particular, the low-frequency measuring signals $NF_L$ and calibration signals $NF_R$ present at the output of the signal acquisition systems 5, 15, after being digitized in the analog/digital converter 7, are each delivered to their own associated low-frequency filter 6 and 16, respectively, before being evaluated in the digital signal-processing unit 8 as to their phase difference, so that from that, the distance O sought of the object can be ascertained. In this variant embodiment, an analog reversing switch between the measurement light path and the reference light path can be dispensed with.

FIG. 3, shows the diagram of a distance meter embodied in simplified form in terms of the components required for detecting the measured light or reference light. In this variant instrument, the same photoelectric measuring receiver 4 is used for sequentially detecting and converting both the beam L scattered or remitted by the object and the reference beam R. To that end, screens 18 and 19 are disposed downstream of the beam splitter 11 in the measuring beam path S and in the reference signal path R; these screens are driven via a motor 20 and block the beam path in alternation. In this way, either the beam L scattered or remitted by the object or the reference beam R reaches the photoelectric measuring receiver 4. The high-frequency electrical signals of the measuring beam or the reference beam, which are applied to the output of the photoelectric receiver 4, such as a PIN photodiode, and are identified in FIG. 3 by reference symbol $HF_{L/R}$, are fed in alternation into the system 5 for signal acquisition. The switchover clock speed is defined by the frequency of the screens 18, 19 that are pivoted into the beam paths R, S. The high-frequency electrical signals $HF_{L/R}$ leave the signal acquisition system 5 in alternation as low-frequency measuring signals $NF_{L/R}$ and are delivered to a low-frequency filter 6, before they are digitized in an analog/digital converter 7 and evaluated for their phase difference in the digital signal evaluator 8.

Figure 4:
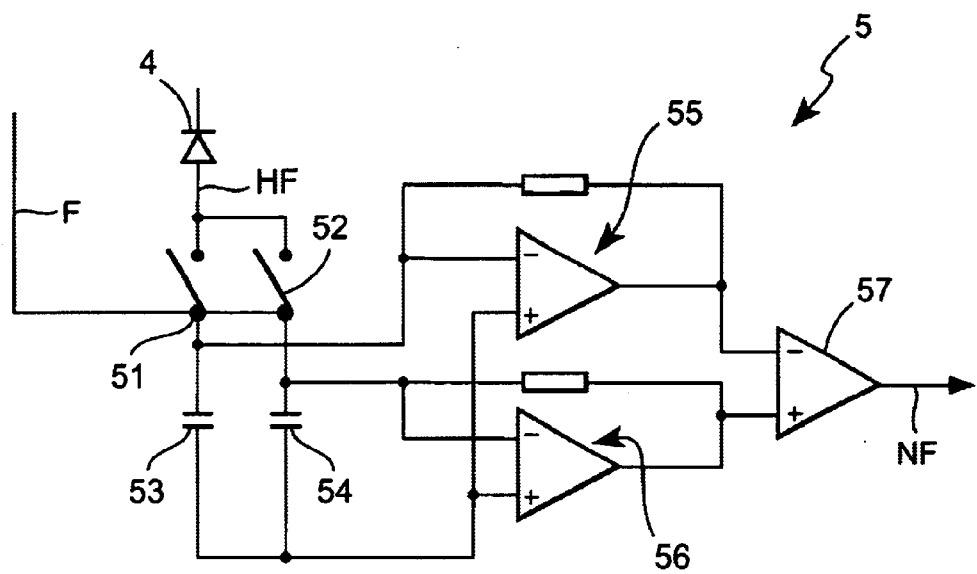
FIG. 4, a schematic illustration of an exemplary variant of the system of the invention.

FIG. 4 schematically shows the layout of a variant of the system 5 for a signal acquisition. The high-frequency electrical signal HF applied to the output of the photoelectric receiver 4 is applied directly to a switch 51 that can be operated at high frequency. The high-frequency switch 51 can be operated at the control frequency F, which differs only slightly from the high-frequency modulation frequency of the measuring beam, as already noted above. The control frequency is advantageously greater than 100 MHz. The high-frequency electrical signal HF is carried at the clock speed of the control frequency F to a capacitor 53, to which a transimpedance amplifier 55 is coupled. The charge present at the capacitor is diverted to the transimpedance amplifier 55. The voltage at the capacitor 53 remains virtually constant. Because the switching rate F of the high-frequency switch 51 differs only slightly from the modulation frequency of the measuring beam, a low-frequency measuring signal is created at the output of the transimpedance amplifier 55; this signal is further processed in the usual way so that a conclusion can be drawn about the distance of the object from the phase of the signal. Because the control frequency for the high-frequency switch 51 differs only slightly from the modulation frequency, the capacitor 53 is always charged with only either the positive or the negative half-wave of the high-frequency signal HF. For the sake of also using the second, negative or positive, half-wave for signal evaluation, a second circuit comprising a high-frequency switch 52, capacitor 54 and transimpedance amplifier 56 is disposed parallel to the first circuit. The switchover between the two circuits is done at the control frequency F. As a result, only the positive half-waves of the measuring signal are passed through the one circuit, and only the negative half-waves of it are passed through the second circuit. The inverted, low-frequency measuring signals present at the output of the two transimpedance amplifiers 55, 56 are united in a downstream differential amplifier 57 and are further processed as a joint low-frequency measuring signal NF.

The circuit layout of the system 5 is especially well suited to various degrees of integration on a single semiconductor component. In particular, the circuits comprising the switches 51, 52, capacitors 53, 54, and transimpedance amplifiers 55, 56 and optionally amplifiers 57 can be made with CMOS technology. The photoelectric receiver 4 can be present externally, or can be integrated on the component. The system 5 for signal acquisition has been explained taking a single photoelectric receiver 4 as an example. For variant instruments in which separate photoelectric receivers are provided for the measurement light path and the reference light path (as in FIGS. 1 and 2, for example), the systems for signal acquisition can each be integrated on separate semiconductor components. Preferably, however, they are jointly combined on a single semiconductor component. The photoelectric receivers and even the generator for the high-frequency control frequency can also be integrated on a single semiconductor component.

Figure 5:
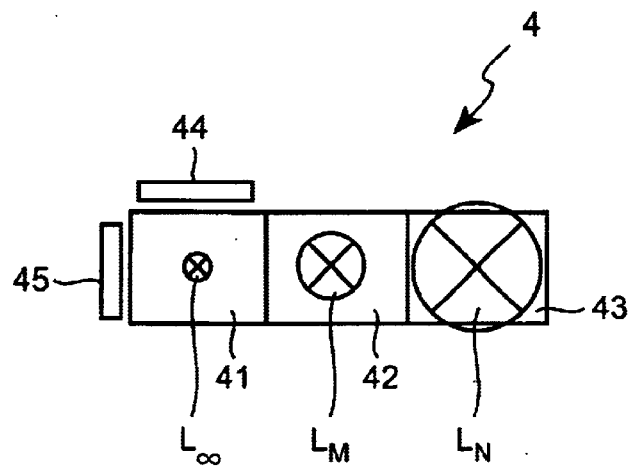
FIG. 5, a schematic illustration of an exemplary variant of a photoelectric receiver.

FIG. 5 schematically shows a photoelectric receiver 4 embodied with integrated semiconductor design. As a special feature, the photoelectric receiver 4 has a segmented active region. In particular, in the exemplary embodiment shown, three active segments 41, 42, 43 are provided, which are triggered individually. The three segments 41, 42, 43 take the projection properties of the receiving optical element into account. Their effect is that at the transition from far-away measurement objects to near-field measurements, light spots of variable size are generated on the photoelectric receiver, and moreover these spots shift laterally relative to the original optical axis, which is generally adjusted for far-away measurement objects. This variable projection is represented in FIG. 5 by the light spots $L_\infty$, $L_M$, and $L_N$. Until now, the attempt has been made to compensate for these projection errors by means of special mirror assemblies in the vicinity of the photoelectric receiver 4. However, this has the disadvantage of carrying interfering ambient radiation to the photoelectric receiver. As a result of the segmented embodiment of the active region of the photoelectric receiver 4, it is possible selectively to activate only the region struck by the measuring light, while the other regions of the photoelectric receiver 4, on which interfering light may fall, are deactivated.

Another advantage of the integrated embodiment of the photoelectric receiver 4 is that adjustment aids can be provided on the integrated semiconductor component. For instance, they comprise auxiliary photodiodes 44, 45, which are disposed in the vicinity of two sides, extending perpendicular to one another, of the active face of the photoelectric receiver 4. As shown in the exemplary embodiment of FIG. 5, the auxiliary photodiodes 44, 45 are disposed in the vicinity of segment 41 for detecting far-away measurement objects. In the adjustment of the optical axis, the auxiliary photodiodes output a signal when the adjusting light beam strikes, thus telling the person or system performing the adjustment which direction the requisite change in position of the photoelectric receiver 4 should be made in. This variant embodiment of the integrated photoelectric receiver offers very major advantages, particularly for automated assembly devices. The integrated embodiment of the photoelectric receiver 4 also offers a simple possibility of integrating optical filters on the component. Such arrangements are known for instance from components that hold CCDs (charge-coupled devices) for digital color cameras, and they are also used in cameras that use film.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for signal acquisition in a distance meter, comprising:

at least one photoelectric receiver, which detects an electromagnetic beam that is high-frequency modulated via a modulation frequency (M) and converts it into high-frequency electrical signals (HF); and a device having a measuring signal path for transforming the high-frequency electrical signals (HF), furnished by the photoelectric receiver, into low-frequency measuring signals ($NF_L$, $NF_R$), which can be carried onward for evaluation to a signal-processing unit mounted downstream, wherein the transforming device for the high-frequency electrical signals furnished by the photoelectric receiver includes:

a switch, whose switching frequency is controlled by a control frequency (F) whose frequency is slightly greater or less than the modulation frequency (M); and a downstream capacitor, which is connected to a transimpedance amplifier at whose output, in operation, the low-frequency measuring signal ($NF_L$, $NF_R$) is present.

2. The system of claim 1, wherein a sequential arrangement of the switch controlled via the high-frequency control frequency (F), the downstream capacitor, and the transimpedance amplifier is present in dual form and can be switched in alternation, and outputs of the two transimpedance amplifiers are connected to inputs of an amplifier that unites two inverse, low-frequency measuring signals.

3. The system of claim 2, wherein the switches are embodied as field effect transistors and are an integrated semiconductor component of the CMOS type.

4. The system of claim 3, wherein the capacitors and the downstream transimpedance amplifiers, and optionally the amplifier that unites the two inverse measuring signals are disposed on the integrated semiconductor component.

5. The system of claim 4, wherein a receiver circuit for a reference signal path has a structure analogous to the measuring signal path and is disposed on the integrated semiconductor component.

6. The system of claim 5, wherein the photoelectric receiver for measuring beam (L) and a separate photoelectric receiver for a reference beam (R) are integrated on the integrated semiconductor component.

7. The system of claim 6, wherein the photoelectric receiver for the measuring beam (L) has a segmented active face and has at least two receiver segments that are activatable independently of one another.

8. The system of claim 7, wherein at least one auxiliary photodiode embodied in integrated form is disposed in a vicinity of two edges, extending perpendicular to one another and adjacent one another, of the active face of the photoelectric receiver for the measuring beam (L).

9. The system of claim 8, wherein the integrated photoelectric receiver for the measuring beam (L) and the photoelectric receiver for the reference beam (k) are provided with integrated optical filters on the integrated semiconductor component.

10. The system of claim 6, wherein the photoelectric receiver for the measuring beam and the photoelectric receiver for the reference beam are each embodied as a PIN photodiode.

11. The system of claim 1, wherein the control frequency (F) is greater than 100 MHz.

12. A distance meter for phase measurement, comprising:
- an emitter for emitting an optical beam (S);
- a receiving optical element for an optical measuring beam (L) remitted or scattered by a measurement object;
- a photoelectric receiver, downstream of the receiving optical element, for converting the optical beam (L) into electrical measuring signals (HF); and
- a signal-processing unit for comparing the measuring signals with reference signals to examine their phase relationship, and to determine a distance (O) of a measurement object, wherein the meter includes a system for signal acquisition according to claim 1.

13. A method for signal acquisition in a distance meter, comprising:
- detecting an electromagnetic beam (L), high-frequency modulated via a modulation frequency (M) and scattered or remitted by an object aimed at using a photoelectric receiver;
- converting the electromagnetic beam into a high-frequency electrical signal (HF), which is carried on to a device for transforming into a low-frequency measuring signal (NF); and
- evaluating the low-frequency measuring signal in a downstream signal-processing unit, wherein the transforming into the low-frequency measuring signal includes;
    - applying the high-frequency electrical signal (HF) present at an output of the photoelectric receiver directly to a switch;
    - controlling a switching frequency of the switch by a control frequency (F) whose frequency is selected to be greater or less, by an amount of the frequency of the low-frequency measuring signal, than the modulation frequency (M) for the electromagnetic beam; and
    - delivering the low-frequency measuring signal, via the switch, to a capacitor, which is connected to a transimpedance amplifier, at whose output, in operation, the low-frequency measuring signal (NF) is present.

* * * * *